United States Patent
Lee et al.

(10) Patent No.: US 11,379,618 B2
(45) Date of Patent: Jul. 5, 2022

(54) SECURE SENSITIVE PERSONAL INFORMATION DEPENDENT TRANSACTIONS

(71) Applicant: International Business Machines Corporation, Armonk, NY (US)

(72) Inventors: Tien Hiong Lee, Singapore (SG); Konstantin Levinski, Singapore (SG); Edwin Boaz Soenaryo, Singapore (SG); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 15/611,326

(22) Filed: Jun. 1, 2017

(65) Prior Publication Data
US 2018/0349644 A1    Dec. 6, 2018

(51) Int. Cl.
*G06Q 20/36* (2012.01)
*G06F 21/62* (2013.01)
*G06Q 20/38* (2012.01)

(52) U.S. Cl.
CPC ....... *G06F 21/6263* (2013.01); *G06Q 20/363* (2013.01); *G06Q 20/3829* (2013.01)

(58) Field of Classification Search
CPC ... G06F 21/6263; G06Q 20/382; G06Q 20/36
See application file for complete search history.

(56) References Cited

U.S. PATENT DOCUMENTS

| | | | |
|---|---|---|---|
| 5,815,665 A * | 9/1998 | Teper | G06Q 20/00 705/26.35 |
| 5,913,202 A | 6/1999 | Motoyama | |

(Continued)

FOREIGN PATENT DOCUMENTS

| | | | | |
|---|---|---|---|---|
| CN | 104021492 A | | 9/2014 | |
| WO | WO-2011068315 A2 * | | 6/2011 | .......... G06F 16/374 |
| WO | WO2016/063092 A1 | | 4/2016 | |

OTHER PUBLICATIONS

"Identity Data Security System for the Digital Identity Wallet", Daeseon Choi, 2009 11th International Conference on Advanced Communication Technology (vol. 03, pp. 1678-1681) (Year: 2009).*

(Continued)

*Primary Examiner* — Neha Patel
*Assistant Examiner* — Duan Zhang
(74) *Attorney, Agent, or Firm* — Stephen J. Walder, Jr.; Jeffrey S. LaBaw

(57) ABSTRACT

A mechanism is provided for secure sensitive private information dependent transactions. A query and a transaction token S associated with a current transaction between a SPI owner and the service provider is received. Particular SPI required is identified based on the query. A request for the particular SPI from the SPI owner is constructed thereby forming a constructed request. The constructed request is sent to one or more authorized devices associated with the SPI owner enrolled with the cognitive SPI broker. The particular SPI is received from a device of the SPI owner thereby forming received SPI. The received SPI is used complete the transaction. A notification is then sent to the SPI owner that the transaction has been completed.

18 Claims, 5 Drawing Sheets

(56) References Cited

U.S. PATENT DOCUMENTS

| | | | |
|---|---|---|---|
| 6,405,245 B1 | 6/2002 | Burson et al. | |
| 6,871,220 B1 | 3/2005 | Rajan et al. | |
| 7,237,114 B1* | 6/2007 | Rosenberg | G06F 21/6209 |
| | | | 705/67 |
| 7,849,204 B2* | 12/2010 | Yared | G06F 21/41 |
| | | | 709/217 |
| 8,386,333 B2 | 2/2013 | Sondregger et al. | |
| 8,504,543 B1 | 8/2013 | Andreessen et al. | |
| 9,173,101 B1* | 10/2015 | Angelov | H04W 12/06 |
| 9,219,724 B1* | 12/2015 | Choudhary | H04L 67/20 |
| 9,407,665 B2 | 8/2016 | Grodzicki et al. | |
| 9,870,420 B2* | 1/2018 | Meyer | G06F 16/353 |
| 10,453,059 B2* | 10/2019 | Lloyd | G06Q 20/3224 |
| 2007/0061396 A1* | 3/2007 | Morris | G06Q 10/02 |
| | | | 709/203 |
| 2010/0121767 A1* | 5/2010 | Coulter | G06Q 20/02 |
| | | | 705/67 |
| 2011/0078127 A1* | 3/2011 | Lin | G06F 16/951 |
| | | | 707/706 |
| 2012/0036360 A1 | 2/2012 | Bassu et al. | |
| 2012/0089481 A1 | 4/2012 | Iozzia et al. | |
| 2013/0226813 A1* | 8/2013 | Voltz | G06Q 20/40145 |
| | | | 705/67 |
| 2013/0346310 A1* | 12/2013 | Burger | G06Q 20/40 |
| | | | 705/44 |
| 2014/0019128 A1* | 1/2014 | Riskin | G06Q 10/06 |
| | | | 704/235 |
| 2014/0108263 A1* | 4/2014 | Ortiz | G06Q 20/3278 |
| | | | 705/71 |
| 2014/0173754 A1* | 6/2014 | Barbir | H04L 63/0815 |
| | | | 726/28 |
| 2015/0066766 A1 | 3/2015 | Wittenburg et al. | |
| 2015/0295712 A1 | 10/2015 | Veugen | |
| 2016/0098576 A1 | 4/2016 | Allen et al. | |
| 2016/0099970 A1 | 4/2016 | Grodzicki et al. | |
| 2016/0104163 A1* | 4/2016 | Aquino | G06Q 40/12 |
| | | | 705/44 |
| 2016/0300222 A1* | 10/2016 | Yang | G06Q 20/065 |
| 2016/0321636 A1* | 11/2016 | Huh | G06Q 20/322 |
| 2017/0054767 A1* | 2/2017 | Goldsmith | G06F 9/461 |
| 2018/0039911 A1* | 2/2018 | Bezzubtseva | G06N 20/00 |

OTHER PUBLICATIONS

Bellala, Gowtham et al., "Securing private data sharing in multi-part", Peer-Reviewed Journal on the Internet, vol. 21, No. 9, Sep. 5, 2016, 8 pages.

* cited by examiner

SECURE SENSITIVE PERSONAL INFORMATION DEPENDENT TRANSACTIONS

BACKGROUND

The present application relates generally to an improved data processing apparatus and method and more specifically to mechanisms for secure sensitive private information dependent transactions.

Today, business transactions are becoming more pervasive and commonplace, and there is a rapid increase in personal data being transferred in these business transactions. The data being transferred may be sensitive personal information (SPI) such as identity information (social security number, birth date, address), financial information (credit card number, bank account number), medical information (medical history), or the like. Service providers request for their customers to provide SPI during business transactions. After the business transactions are completed and the relevant services are delivered to the customers, the service providers storing the SPI, obtained from their customers during the course of the business, in their data datacenters. SPI owners have to rely on the service providers to safeguard their SPI.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for secure sensitive private information (SPI) dependent transactions. The illustrative embodiment receives a query and a transaction token S associated with a current transaction between a SPI owner and the service provider. The illustrative embodiment identifies particular SPI required based on the query. The illustrative embodiment constructs a request for the particular SPI from the SPI owner thereby forming a constructed request. The illustrative embodiment sends the constructed request to one or more authorized devices associated with the SPI owner enrolled with the cognitive SPI broker. The illustrative embodiment receives the particular SPI from an authorized device of the SPI owner thereby forming received SPI. The illustrative embodiment uses the received SPI to complete the transaction. The illustrative embodiment sends a notification to the SPI owner that the transaction has been completed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
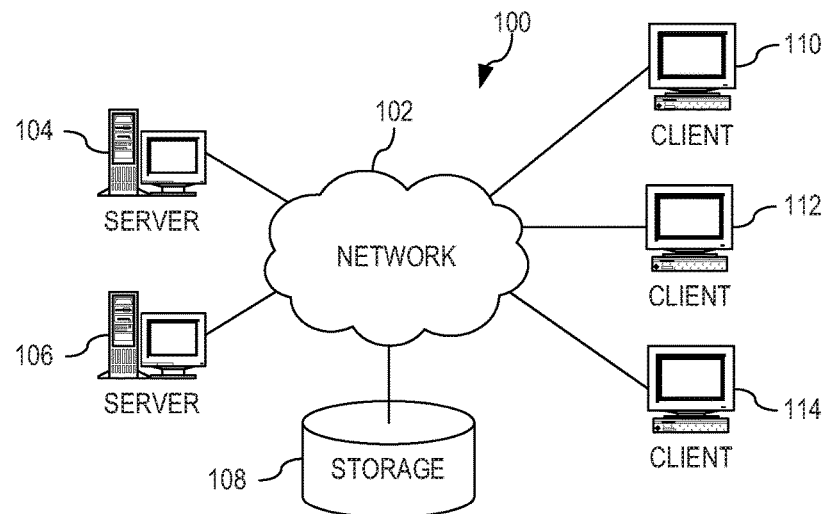
FIG. 1 is an example diagram of a distributed data processing system in which aspects of the illustrative embodiments may be implemented.

The illustrative embodiments provide mechanisms for secure sensitive private information dependent transactions. As noted above, after business transactions are completed, service providers store sensitive personal information (SPI) provided by a customer and the owner of the SPI (i.e. the customer) has to rely on the service providers to safeguard their SPI. That is, the delivery of web services over the internet requires service providers to obtain personal data from their customers (i.e. consumers of the web services and owners of the SPI). To perform the business transactions, personal data of the customers has to be supplied and disclosed to the service providers. The personal data, often sensitive and private in nature, includes information such as name, birth date, telephone number, social security number, address, credit card numbers in combination with any security codes, medical records, or the like.

Unfortunately, there is no comprehensive system of oversight in place, and possibly, lack of governance, to ensure that service providers and any outsourced business partners utilized by the service providers to only use their customers' SPI only for the purpose of performing business transactions related to the customer. SPI owners have no choice but to trust that the service providers will protect their personal data. However, the SPI owners have no means of identifying which service provider to trust. Service providers may claim in their service agreements that they do not retain the data after use but, in reality, the service providers and their outsourced business partners may collect and store the customers' SPI within their own datacenters on premise without their customers' consent and/or knowledge. The service providers may also claim that the data they store is encrypted and secure but, ultimately, the SPI owners are still placing their SPI in the hands of the service providers. Furthermore, in the course of carrying out the business transactions, the SPI may be transferred to an outsourced business partners that may be in another country. However, in other countries, there may not be adequate data protection measures to safeguard the SPI, which may be another place where issues emerge.

The SPI that is obtained from the customers may be retained by the service providers and stored within their datacenters. There is no assurance that the SPI may be intentionally or unintentionally leaked for unauthorized use. Thus, SPI owners may be skeptical about the safety and security their SPI being stored by the service providers because of concerns revolving around the reliability of the service providers. That is, SPI owners are often in the dark about the security capabilities of the service providers. For instance, the SPI owners are not aware if their service providers have well-implemented encryption solutions to protect the data (versus limited use of encryption in their datacenters), have enforced strict access control over the encrypted data, have demonstrated compliance with the security requirements of data compliance regulations, have ever suffered a data breach, have security audits performed on their internal data security controls against a recognized standard by a reputable third-party organization, or have security audits performed against their partners to enforce secure handling of the owners' SPI outside of boundaries of the organizations.

That is, there is simply no way to be completely sure that the SPI will remain secure once it is released to the organizations and/or stored in the service providers' datacenters. Thus, the SPI owner totally loses control over their SPI from the very moment the customer releases their SPI to the service providers, and the customer's SPI is completely subjected to the security capabilities of the service provider to protect the SPI from unauthorized use, either intentionally or unintentionally.

The illustrative embodiments provide mechanisms for secure sensitive private information dependent transactions. The proliferation of mobile devices and wearables technologies, such as smartwatches, google glasses, or the like, has revolutionized the way organizations (e.g. service providers, cloud service providers, on-line merchants, or the like) perform business transactions and deliver goods and services to their customers. As these business transactions require the customers to provide their SPI to the organizations, a wide variety of data privacy and security-related concerns arise.

Within the illustrative embodiments, a cognitive system secures business transactions between service providers and their customers (i.e. SPI owners). These business transactions involve execution of multiple operations. For example, when a customer purchases merchandise from an on-line retail merchant, the transaction involves the payment to the on-line retail merchant (for which the customer has to release private information, such as identity information (social security number, birth date, address), financial information (credit card number, bank account number), medical information (medical history), or the like, and delivery of the merchandise to the customer's address. The cognitive system comprises of a cognitive SPI broker that acts as a secure intermediary between service providers and customers, allowing a customer to transact with the service provider without revealing their SPI to the service provider throughout the life cycle of the business transactions. With reference to the above-mentioned example, the cognitive system enables the customer to make payments without revealing financial information to the on-line retail merchant.

Using business rule markup languages, constraint languages, natural languages, or the like, service providers construct queries comprising criteria to be fulfilled by customers for service requests, and send the queries to the cognitive SPI broker for processing. The cognitive SPI broker determines the relevant SPI required for its cognitive reasoning and decision-making process. The cognitive SPI broker constructs one or more requests for specific SPI and sends the one or more requests to the customer. The requests may include the locations of the secure virtual wallets of the customer that store the specific SPI, with the locations of the virtual wallets determined from a taxonomy of the SPI stored for the customer in a user registry database in the cognitive SPI broker. The taxonomy of the SPI comprises a mapping of different types of SPI to different virtual wallets stored in different devices, for each enrolled user.

That is, in a first embodiment, the cognitive SPI broker searches a taxonomy of the SPI stored for the customer in a user registry for a location, i.e. an authorized device associated with the enrolled user, of a virtual wallet associated with the customer where the specific SPI is located. When the cognitive SPI broker identifies only one virtual wallet where the specific SPI is located, the cognitive SPI broker sends a request to authorized device comprising the identified virtual wallet. In this embodiment, the customer then decides whether to approve the release of the specific SPI in the one identified virtual wallet to the cognitive SPI broker for cognitive reasoning and decision-making process.

In a second embodiment, the cognitive SPI broker searches a user registry for a location, i.e. an authorized device associated with the enrolled user, of a virtual wallet associated with the customer where the specific SPI is located. If the cognitive SPI broker is unable to identify a specific virtual wallet that comprises the specific SPI, the cognitive SPI broker sends one or more requests for the specific SPI to the one or more authorized devices associated with the enrolled user. Upon receipt of the one or more requests for the specific SPI, the customer adds the specific SPI to one or more virtual wallets if the customer decides to approve the release of the specific SPI. Once the specific SPI is added to one or more virtual wallets, thereby indicating that the specific SPI is to be released, the cognitive SPI broker propagates the specific SPI to the taxonomy of the SPI stored for the customer in the user registry in the cognitive SPI broker. Thus, from then on, the cognitive SPI broker will be able to identify a specific virtual wallet that comprises the same SPI as the location of the virtual wallet that stores this particular SPI is available in the taxonomy of the SPI stored for the customer in the enrolled user registry database in the cognitive SPI broker. The new SPI that has just been added by the customer to a virtual wallet in the authorized device and propagated to the taxonomy of the SPI stored for the customer in the user registry in the cognitive SPI broker is then released to the cognitive SPI broker for cognitive reasoning and decision-making process.

In a third embodiment, the cognitive SPI broker searches the taxonomy of the SPI stored for the customer in a user registry for a location, i.e. an authorized device associated with the user, of a virtual wallet associated with the customer where the specific SPI is located. In this embodiment, the cognitive SPI broker identifies that the specific SPI is located in more than one virtual wallet. Therefore, the cognitive SPI broker sends one or more requests to the authorized device(s) comprising the more than one virtual wallet. The customer then selects the more than one virtual wallet in the authorized device(s) where the specific SPI resides indicating an approval to the release of the specific SPI in the more than one virtual wallet, thereby releasing the specific SPI to the cognitive SPI broker for cognitive reasoning and decision-making process.

In all the three scenarios, instead of releasing the specific SPI to the service providers, the SPI owner (i.e. the customer) releases the SPI to the cognitive SPI broker, leaving no opportunities for any potential misuse, loss, or unauthorized access of the specific SPI by the service providers and their outsourced business partners. Based on the requested SPI released from the customer, criteria in the constructed queries from the service providers and a mastered knowledge base, the cognitive SPI broker performs cognitive reasoning and deduces an implied cognitive result. The cognitive SPI broker will respond to the service providers with results of its cognitive reasoning, from which the service providers will execute the next action.

With the cognitive system for secure SPI-dependent business transactions, the SPI owner never releases SPI to anyone but the cognitive SPI broker throughout the entire life cycle of the business transaction. SPI is always in the owner's possession and thus, the SPI owner controls storage, protection, and release of such SPI. There is no risk of SPI being compromised, as in the case of misuse and/or unauthorized storage of the owner's SPI by the service providers and their outsourced business partners. This cognitive system allows the user to have a whole new level of customer experience in business transactions, without worrying about the safety and security of SPI, as the customer retains full control of the SPI in virtual digital wallets.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
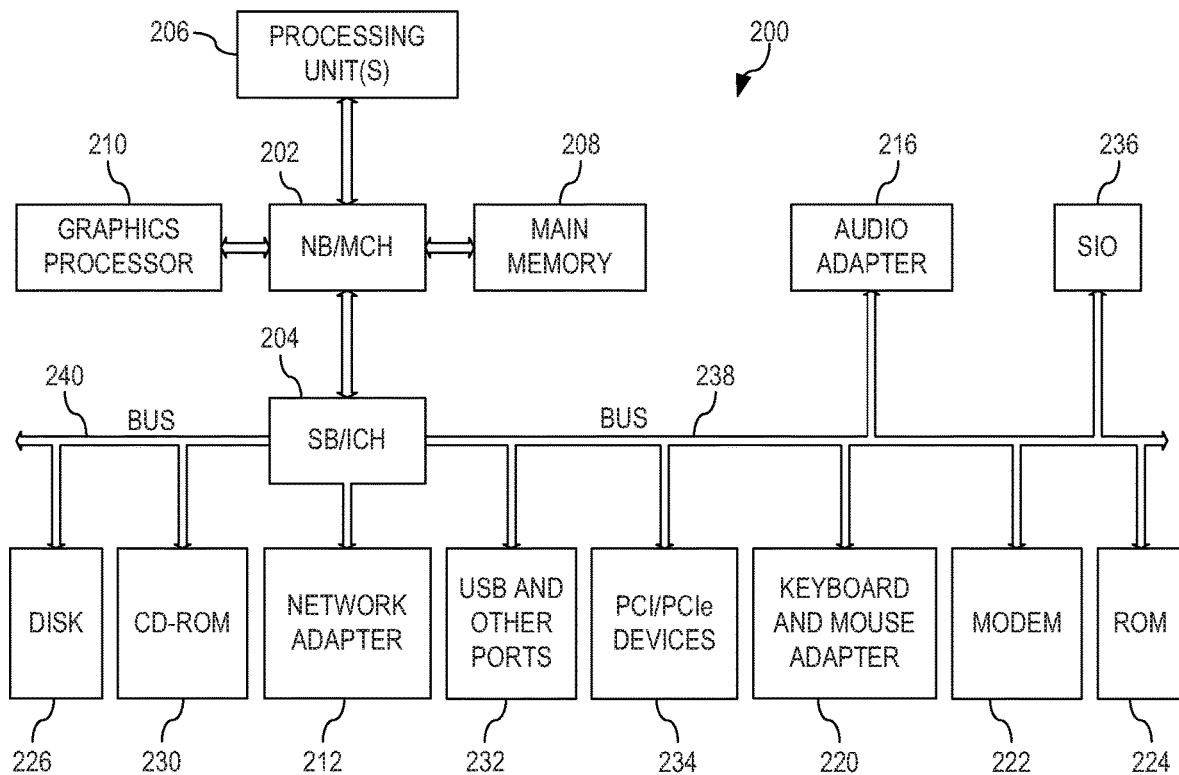
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 comprises at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement mechanisms for secure sensitive private information dependent transactions. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates secure sensitive private information dependent transactions.

As noted above, the mechanisms of the illustrative embodiments utilize specifically configured computing devices, or data processing systems, to perform the operations for secure sensitive private information dependent transactions. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanisms for secure sensitive private information dependent transactions.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
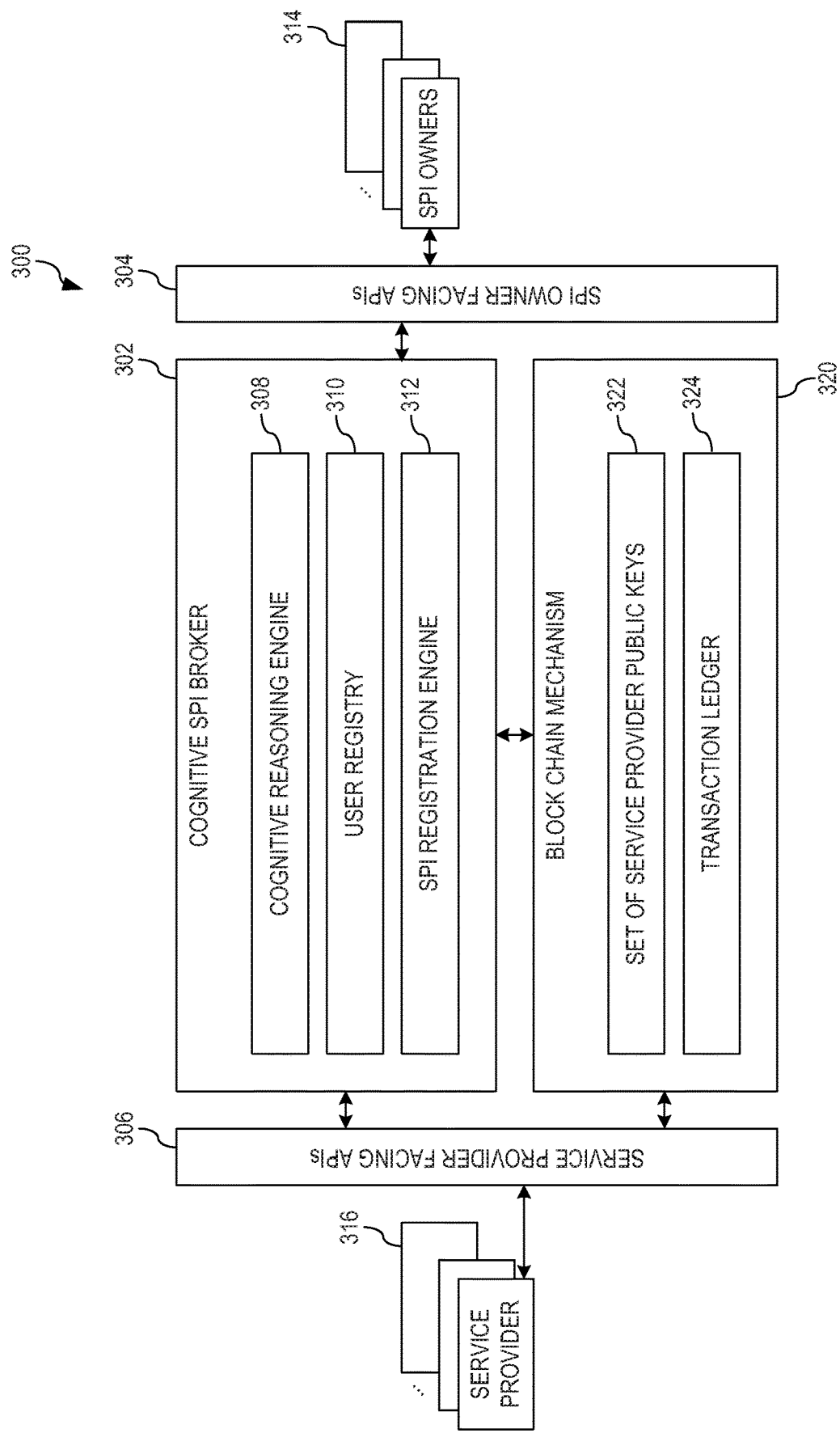
FIG. 3 depicts a functional block diagram of a mechanism for secure sensitive private information dependent transactions in accordance with an illustrative embodiment.

FIG. 3 depicts a functional block diagram of a mechanism for secure sensitive private information dependent transactions in accordance with an illustrative embodiment. Data processing system 300 comprises cognitive sensitive personal information (SPI) broker 302 coupled to SPI owner facing application program interfaces (APIs) 304 and service provider facing APIs 306. SPI owners 314 and service providers 316 utilize SPI owner facing APIs 304 and service provider facing APIs 306, respectively, to perform tasks like user enrollment, device authorization, business transactions, or the like. Cognitive SPI broker 302 comprises cognitive reasoning engine 308, user registry 310, and SPI registration engine 312. Cognitive reasoning engine 308 is a lexical module that analyzes and processes queries and requests from service providers 316 received via service provider facing APIs 306. That is, cognitive reasoning engine 308 runs cognitive-based reasoning and decision-making algorithms that act on those queries and requests. User registry 310 is a taxonomy of the SPI for all SPI owners 314 enrolled with Cognitive SPI broker 302 via a user enrollment process and device authorization process. Further details on each of the mechanisms are described in details that follow.

Block chain mechanism 320 maintains a public key of cognitive SPI broker 302 and public keys 322 of service providers 316 that utilize cognitive SPI broker 302, such as bodies and organizations from industries, such as healthcare enterprises, financial enterprises, insurance enterprises, government enterprises, or the like, as well as merchants, such as Amazon, eBay, Walmart, or the like. The participating service providers 316 exchange public keys 322 with block chain mechanism 320, which stores public keys 322 in order to establish secure transactions. Block chain mechanism 320 also maintains transaction ledger 324 that preserves a permanent record of all business transactions for each of the service providers 316, which are accessible by the respective service providers 316 and respective SPI owners 314 through cognitive SPI broker 302. That is, block chain mechanism 320 tracks in transaction ledger 324 every business transaction that ever occurred in the cognitive SPI ecosystem, providing conclusive proof that a particular business transaction occurred at a specify point in time and the transparency to relevant parties when required. The use of block chain mechanism 320 in data processing system 300 provides a secure environment to perform business transaction.

Service provider facing APIs 306 are a set of APIs which merchants, service providers, healthcare providers, financial providers, insurance providers, government organizations, or the like, use to perform transactions using public keys 322, query transaction ledger 324, or the like. SPI owner facing APIs 304 are a set of APIs that SPI owners 314 and their digital wallets use to interface with cognitive SPI broker 302. That is, cognitive SPI broker 302 provide a set of processes that service providers 316 and SPI owners 314 utilize, via service provider facing APIs 306 and SPI owner facing APIs 304 respectively. The set of processes may include, but are not limited to user enrolment, device management, business transactions, or the like. The device management process may include, but is not limited to, authorization of devices where user registers new devices with SPI registration engine 312 to perform business transactions, update of user registry 310 where users load new SPI into digital wallet(s) and update their SPI taxonomy in the user registry 310. The exemplary processes and their interplay operate as follows.

In a service provider registration process, each service provider 316 registers for an account with cognitive SPI broker via block chain mechanism 320. In the service provider registration process, each service provider 316 accesses block chain mechanism 320 via one of service provider facing APIs 306, where the service provider 316 registers the service provider's public key portion of a private/public key pair with block chain mechanism 320, which block chain mechanism 320 stores as one of public keys 322. At this point, block chain mechanism 320 exchanges a public key portion of a private/public key pair associated with cognitive SPI broker 302, which block chain mechanism 320 stores as one of public keys 322, with service provider 316. That is, the public key of service provider 316 is stored as one of public keys 322 to be used by cognitive SPI broker 302 is, while service provider 316 receives the public key of cognitive SPI broker 302 from the block chain mechanism 320. The exchange of public keys 322 is then utilized to establish a secure channel for each business transaction conducted by service provider 316 and cognitive SPI broker 302. All communications are secured and encrypted, so that only the intended parties may decrypt and read the contents of the messages in the business transactions.

In a SPI owner 314 enrollment process, SPI owner 314 (i.e. the user, customer, consumer, or the like) accesses SPI registration engine 312 via one of SPI owner facing APIs 304, where SPI owner 314 completes a user registration form. When SPI owner 314 submits the completed registration form via SPI registration engine 312, SPI registration engine 312 generates a unique cookie N that is used to identify the enrolled SPI owner 314, as the cookie N is associated with the enrolled SPI owner 314. SPI registration engine 312 stores this association and all SPI owner data associated with the enrolled SPI owner 314 in the user registry 310. Hence, each SPI owner 314 will only need to enroll once.

In the device management process, each SPI owner 314 is required to authorize each of the SPI owner's devices that will be used in secure sensitive private information dependent transactions with cognitive SPI broker 302 via SPI registration engine 312. During device authorization, a public key portion of a private/public key pair of the SPI owner's device and the public key of the private/public key pair of cognitive SPI broker 302 are exchanged. The public key of the SPI owner's device will be sent to cognitive SPI broker 302, while the SPI owner's device will receive the public key of cognitive SPI broker 302 from the block chain mechanism 320. The exchange of public keys between the SPI owner's device and cognitive SPI broker 302 is to establish a secure channel for each business transaction conducted by SPI owner 314 via the SPI owner's device and service provider 316 via cognitive SPI broker 302. All communications are secured and encrypted, so that only the intended parties may decrypt and read the contents of the messages in the business transactions.

Once the public keys are exchanged, SPI registration engine 312 requests SPI owner 314 to input a one-time password (OTP), which SPI registration engine 312 transmits to the device, authorizing the device for future business transactions. The authorized device will be associated with SPI owner 314 (identified by the cookie N), and SPI registration engine 312 then adds the authorized device to the user registry 310. From this point on, SPI owner 314 may use the authorized device to perform business transactions with cognitive SPI broker 302.

The SPI owner device authorization process may occur multiple times if SPI owner 314 has multiple devices, such as wearables, mobile devices, laptops, workstations, or the like. If SPI owner 314 intends to perform business transactions from any of the devices, SPI owner 314 will have to authorize each device with cognitive SPI broker 302. Each of the devices have their own public keys (one public key per device) that are exchanged with the public key of cognitive SPI broker 302 during separate device authorization sessions with SPI registration engine 312. A taxonomy of the SPI of the SPI owner will be constructed by cognitive SPI broker 302 based on the information collected during the user enrollment and device authorization processes. The taxonomic information of the SPI will be organized in a hierarchal structure, which SPI registration engine 312 stores in user registry 310. This SPI taxonomy will be used by cognitive SPI broker 302 to identify which of one or more digital wallet(s) in the SPI owner's authorized device(s) comprise SPI relevant to a business transaction and the location information will be conveyed to SPI owner 314. The ability of cognitive SPI broker 302 to identify which digital wallet(s) comprises the SPI relevant to the business transaction is part of a learning process between SPI owner 314 and cognitive SPI broker 302. That is, initially, cognitive SPI broker 302 has no information as to which digital wallets of SPI owner 314 comprise which relevant SPI information. However, as the user identifies the particular one(s) of the digital wallets that comprises the relevant SPI information, the location of the digital wallet(s) is returned to the cognitive SPI broker 302. Cognitive SPI broker 302 then uses this information in later business transactions in order to speed up the business transaction process. Thus, the SPI owner's SPI may be mapped to different digital wallets in different authorized devices authorized for business transactions with cognitive SPI broker 302. The SPI owner's digital wallets may reside in one or more of the SPI owner's authorized devices and, further, SPI for any one business transaction may reside in one or more of the SPI owner's authorized devices to provide for multiple factor transaction security. Additionally, when SPI owner 314 adds new SPI into a particular digital wallet, the SPI change may be propagated to user registry 310 via SPI registration engine 312.

In the business transaction process, SPI owner 314 visits a service provider's website on an authorized device, i.e. one of the SPI owner's devices authorized to perform business transactions with cognitive SPI broker 302 in the device management process described previously, or an device that has not yet been through the device management process, if SPI owner 314 initiates a request to purchase an item from the service provider's website, will be authorized with cognitive SPI broker 302 in the device management process described previously. When SPI owner 314 initiates a request to purchase the merchandise item, cognitive SPI broker 302 receives, from service provider 316, a query and a business transaction token S associated with the current business transaction between SPI owner 314 and service provider 316. That is, utilizing the business transaction token S, service provider 316 builds a query for cognitive SPI broker 302, so that cognitive SPI broker 302 may associate the query with the appropriate SPI owner identified by the cookie N. Service provider 316 constructs the query using one or more of business rule markup languages, constraint languages, natural languages, or the like. The query may comprise criteria required to be fulfilled by SPI owner 314 for the request to purchase the merchandise item initiated by SPI owner 314. Service provider 316 sends the query, along with the transaction token S, to cognitive SPI broker 302 for processing.

In sending the query, service provider facing API 306 of service provider 316 signs the query with a private key of service provider 316 to produce a signature and encrypts the query with the public key of cognitive SPI broker 302. In one example, the query to be sent by service provider 316 is modeled by the equation:

$$x = enc(\text{sign}(\{q\}, sk(k)), pk(k))$$

where q represents the query to be sent from service provider 316 to cognitive SPI broker 302, $sk(k)$ represents the private (secret) key of service provider 316, $\text{sign}(sk(k), \{q\})$ represents a query q signed using the private (secret) key $sk(k)$, $pk(k)$ represents the public key of cognitive SPI broker 302, and $enc(\alpha, \beta)$ represents the encryption operator, i.e. the resultant signed query a encrypted using public key $\beta$. Again, query q is composed of cookie N, business transaction token S, requested SPI information, and the request, response, confirmation, or the like.

In receiving the query, cognitive SPI broker 302 verifies the authenticity of the message by decrypting the signature with the service provider's public key (to confirm that the sender, and no one else, performed the signature operation), which results in only the recipient holding the paired private/public key decrypting the message as no one else possesses this matching private key. In one example, the query to be decrypted from service provider 316 is modeled by the equation:

$$q = dec(\text{checksign}(\{x\}, pk(k)), sk(k))$$

where x represents the signed and encrypted query, pk(k) represents the public key of service provider 316, sk(k) represents the private (secret) key of cognitive SPI broker 302, checksign(pk(k),{x}) represents checking the validity of the signature of query x by using the public key pk(k) of service provider 316, and dec(γ,δ) represents the decryption operator, i.e. the unsigned query y decrypted using private key δ.

Cognitive reasoning engine 308 in cognitive SPI broker 302 interprets the query from service provider 316. If the query comprises criterion or instructions that are not related to the current transaction, cognitive reasoning engine 308 detects the improper criterion or instructions immediately rejects the service provider's query, thereby terminating the business transaction. For example, if SPI owner 314 is intending to purchase an item from service provider 316 and service provider 316 constructs the query comprising an illegitimate criterion like "user's salary greater than some value", cognitive reasoning engine detect the illegitimate criterion, rejects the service provider's query, and terminates the business transaction.

Cognitive reasoning engine 308 determines the identity of SPI owner 314 associated with the query from the transaction token S, thereby preventing user identify theft. Further, cognitive reasoning engine 308 also identifies the particular SPI required based on the query. Cognitive reasoning engine 308 then constructs a request for the relevant SPI for the current business transaction. In addition, the constructed request also comprises specific locations of the digital wallets of SPI owner 314 that store the requested SPI, if known. Cognitive reasoning engine 308 identifies the digital wallets that include the relevant SPI from a taxonomy of the SPI stored in user registry 310. Finally, cognitive reasoning engine 308 sends the constructed request to the application, operating system, or the like, on the SPI owner's authorized device(s) comprising the identified digital wallet(s) using an encryption similar to that previously described with regard to service provider 316. If the SPI digital wallet(s) are unknown, cognitive reasoning engine 308 sends the constructed request to all of the SPI owner's devices authorized to perform business transactions with cognitive SPI broker 302 using an encryption similar to that previously described with regard to service provider 316.

Upon receive the request from cognitive reasoning engine 308, the SPI owner authorized device(s) decrypt the request using a decryption similar to that previously described with regard to service provider 316. After the decryption, the SPI owner authorized device(s) generates a notification to SPI owner 314 upon receiving the constructed request that prompts SPI owner 314 for a response. If the digital wallet(s) are identified by the cognitive reasoning engine 308, then SPI owner 314 may only need to authorize the constructed request. If the digital wallet(s) are not identified in the constructed request, then the relevant SPI may reside in multiple wallets in the SPI owner's authorized device. SPI owner 314 will have to select one or more digital wallet(s) from a list of digital wallets available in the SPI owner's authorized device. If the SPI resides on more than one of the SPI owner's authorized devices, then SPI owner 314 may make multiple digital wallet selects from each of the necessary SPI owner authorized devices. For example, SPI owner 314 may have multiple credit cards residing in multiple digital wallets on the SPI owner's authorized device. The constructed request from cognitive reasoning engine 308 will show all available credit cards in various digital wallets that SPI owner 314 may use for the current business transaction. SPI owner 314 will have to choose which credit card(s) to use for the business transaction. SPI owner 314 will then authorize the release of the SPI from the digital wallet(s) which causes the SPI to be transmitted to cognitive SPI broker 302. This process demonstrates an "active" approach which provides the PSI owner the convenience to authorize the release of SPI in a single step, such as tapping a button on the SPI device, versus a "passive" approach which requires SPI owner 314 to perform several steps to complete the business transaction.

In the "passive" approach, SPI owner 314 may have to launch each digital wallet application on the SPI owner's device and manually search through all the digital wallets to find the type of SPI that is relevant for the current transaction. Then, SPI owner 314 has to pick a relevant SPI from one of the digital wallets. Again, if more than one type of SPI is required for the current business transaction, then SPI owner 314 will have to repeat the search for each SPI type. Finally, SPI owner 314 has to manually enter each type of SPI into an input form (e.g. credit card number, social identification number, passport number, or the like) before releasing the SPI from the SPI owner's device. This approach is very cumbersome, time-consuming and error-prone. In contrast, the "active" approach provides a release of SPI from the SPI owner's device(s) that is intuitive, user-friendly, and convenient.

Once the SPI is released to cognitive SPI broker 302, cognitive SPI broker 302 performs cognitive reasoning and deduces a cognitive result. Cognitive SPI broker 302 notifies the service provider of the cognitive result and executes the appropriate action based on the cognitive result as well as notifies SPI owner 314 that the transaction is complete.

In order to exemplify the business transaction process, consider the following examples. The first example deals with a business transaction involving credit card payment to service provider 316 for merchandise provider by service provider 316. Initially, SPI owner 314 visits the service provider's website and selects merchandise to be purchased. Service provider 316 generates a query, as detailed previously, and sends the query to cognitive SPI broker 302 via service provider facing APIs 306. If known, cognitive SPI broker 302 notifies SPI owner 314 of one or more digital wallets the SPI owner's authorized device(s) where the relevant SPI (i.e. credit card details) is located via SPI owner facing APIs 304. The particular one(s) of the digital wallets required for the relevant SPI is identified by cognitive SPI broker 302 for the SPI owner's taxonomy in user registry 310. If unknown, cognitive SPI broker 302 notifies SPI owner 314 of the required SPI with an identification of all digital wallets associated with the SPI owner's authorized device via SPI owner facing APIs 304. Regardless if only a particular one(s) of the digital wallets are identified or if all of the digital wallets are identified, SPI owner 314 selects amongst the identified digital wallets for the digital wallet(s) with the required SPI (i.e. credit card details), which is then returned to cognitive SPI broker 302.

Cognitive SPI broker 302 then validates the credit card detail released by SPI owner 314 by sending the credit card transaction to the associated bank using a gateway service, payment processor, or the like. The credit card transaction is routed through the associated bank to determine if sufficient funds (i.e. funds to cover the purchase of the merchandise associated with the business transaction) are available and, if so, the associated bank places a reserve in an amount equal to the purchase amount of the merchandise. Cognitive SPI broker 302 receives a reply from the associated bank that the reserve has been placed and cognitive SPI broker 302 provides a request to the associated bank to make the payment. Once the payment is made, cognitive SPI broker 302 notifies SPI owner 314 that the credit card payment has been made. Cognitive SPI broker 302 also stores the identified digital wallet(s) that comprise the credit card information in user registry 310 for use in future business transactions.

If known, cognitive SPI broker 302 notifies SPI owner 314 of one or more digital wallets the SPI owner's authorized device(s) where the relevant SPI (i.e. shipping address) is located. The particular one(s) of the digital wallets required for the relevant SPI is identified by cognitive SPI broker 302 for the SPI owner's taxonomy in user registry 310. If unknown, cognitive SPI broker 302 notifies SPI owner 314 of the required SPI with an identification of all digital wallets associated with the SPI owner's authorized device. Regardless if only a particular one(s) of the digital wallets are identified or if all of the digital wallets are identified, SPI owner 314 selects amongst the identified digital wallets for the digital wallet(s) with the required SPI (i.e. shipping address), which is then returned to cognitive SPI broker 302. It should be noted that the requests from SPI owner 314 for the required SPI may be done as separate transactions (as illustrated) or as one transaction, where SPI owner 314 identifies the credit card information and the shipping address in one communication with cognitive SPI broker 302. Cognitive SPI broker 302 then sends the SPI owner's shipping address to service provider 316 indicating that payment has been completed. Service provider 316 then initiates shipment of the merchandise to SPI owner 314 at the given address.

The second example deals with a business transaction involving an insurance coverage application. In this example, SPI owner 314 applies for health insurance coverage offered by an insurance company, i.e. service provider 316. Service provider 316 constructs a query using business rule markup languages, constraint languages, natural languages, or the like, requesting verification of information for SPI owner 314, such as whether SPI owner 314 is a non-smoker, age, birth date, or the like. Service provider 316 sends the query to cognitive SPI broker 302 via service provider facing APIs 306. If known, cognitive SPI broker 302 notifies SPI owner 314 of one or more digital wallets the SPI owner's authorized device(s) where the relevant SPI (i.e. non-smoker, no previous hospitalizations, non-alcohol user, or the like) is located via SPI owner facing APIs 304. The particular one(s) of the digital wallets required for the relevant SPI is identified by cognitive SPI broker 302 for the SPI owner's taxonomy in user registry 310. If unknown, cognitive SPI broker 302 notifies SPI owner 314 of the required SPI with an identification of all digital wallets associated with the SPI owner's authorized device via SPI owner facing APIs 304. Regardless if only a particular one(s) of the digital wallets are identified or if all of the digital wallets are identified, SPI owner 314 selects amongst the identified digital wallets for the digital wallet(s) with the required SPI (i.e. non-smoker, no previous hospitalizations, non-alcohol user, or the like), which is then returned to cognitive SPI broker 302.

Based on the request information from service provider 316, cognitive SPI broker 302 only replies to service provider 316 as to whether the SPI of SPI owner 314 meets the conditions requested in the query sent by the service provider. It should be noted that, if the request is for verification of personal information, such as birth date, address, social security number, or the like, service provider 316 includes the information from the application in the query. Then cognitive SPI broker 302 merely verifies that the information is correct using the SPI of SPI owner 314 rather than releasing any SPI from the digital wallets of SPI owner 314 to service provider 316. Based on verification of the SPI from SPI owner 314, service provider 316 may request verification of additional information, approve the SPI owner's health insurance application, or deny approve the SPI owner's health insurance application. If service provider 316 requests verification of additional information, then the process is repeated. If service provider 316 approves or denies the health insurance application, then cognitive SPI broker 302 provides an appropriate notification to SPI owner 314.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
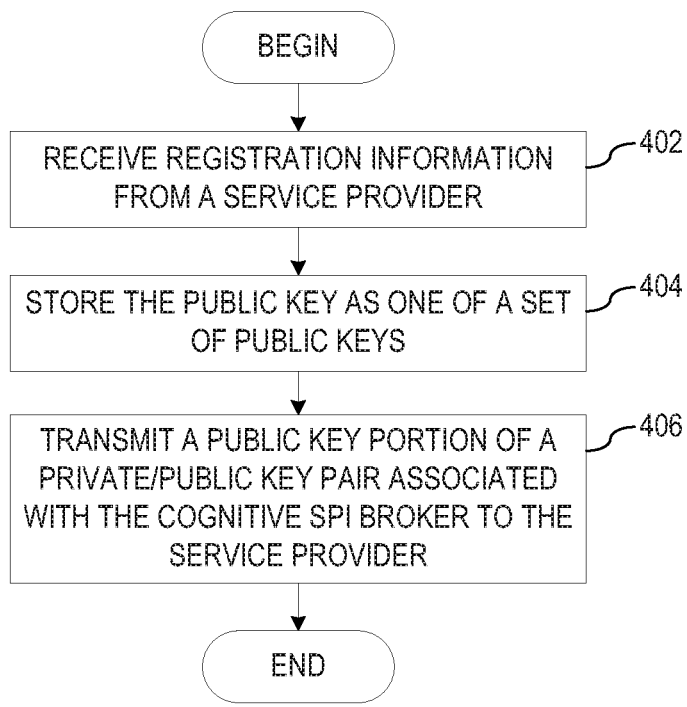
FIG. 4 depicts one exemplary flow diagram of a service provider registration process in accordance with an illustrative embodiment.

FIG. 4 depicts one exemplary flow diagram of a service provider registration process in accordance with an illustrative embodiment. As the operation begins, a block chain mechanism receives registration information from a service provider (step 402), the registration information comprising a public key portion of a private/public key pair. Response to receiving the registration information from the service provider, the block chain mechanism stores the public key as one of a set of public keys (step 404). The block chain mechanism then transmits a public key portion of a private/public key pair associated with the cognitive SPI broker to the service provider (step 406). The exchange of public keys between the service provider and the cognitive SPI broker is to establish a secure channel for each business transaction conducted by the service provider and the SPI owner's authorized device via the cognitive SPI broker. All communications are secured and encrypted, so that only the intended parties may decrypt and read the contents of the messages in the business transactions. From this point on, the service provider may conduct business transactions with a SPI owner via the cognitive SPI broker.

Figure 5:
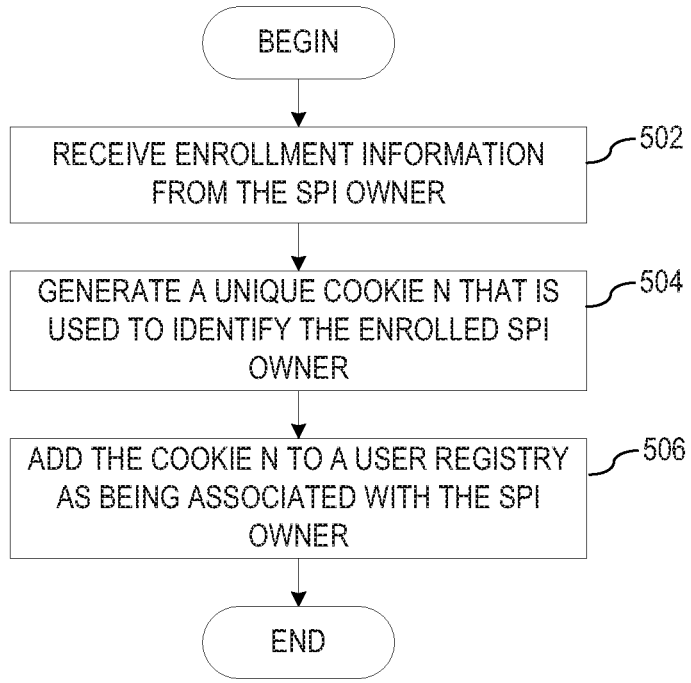
FIG. 5 depicts one exemplary flow diagram of a SPI owner enrollment process in accordance with an illustrative embodiment.

FIG. 5 depicts one exemplary flow diagram of a SPI owner enrollment process in accordance with an illustrative embodiment. As the operation begins, the SPI registration engine receives enrollment information from the SPI owner (step 502). Response to receiving the registration information from the SPI owner, the SPI registration engine generates a unique cookie N that is used to identify the enrolled SPI owner (step 504). The SPI registration engine then adds the cookie N to a user registry as being associated with the SPI owner (step 506), with the operation ending thereafter.

Figure 6:
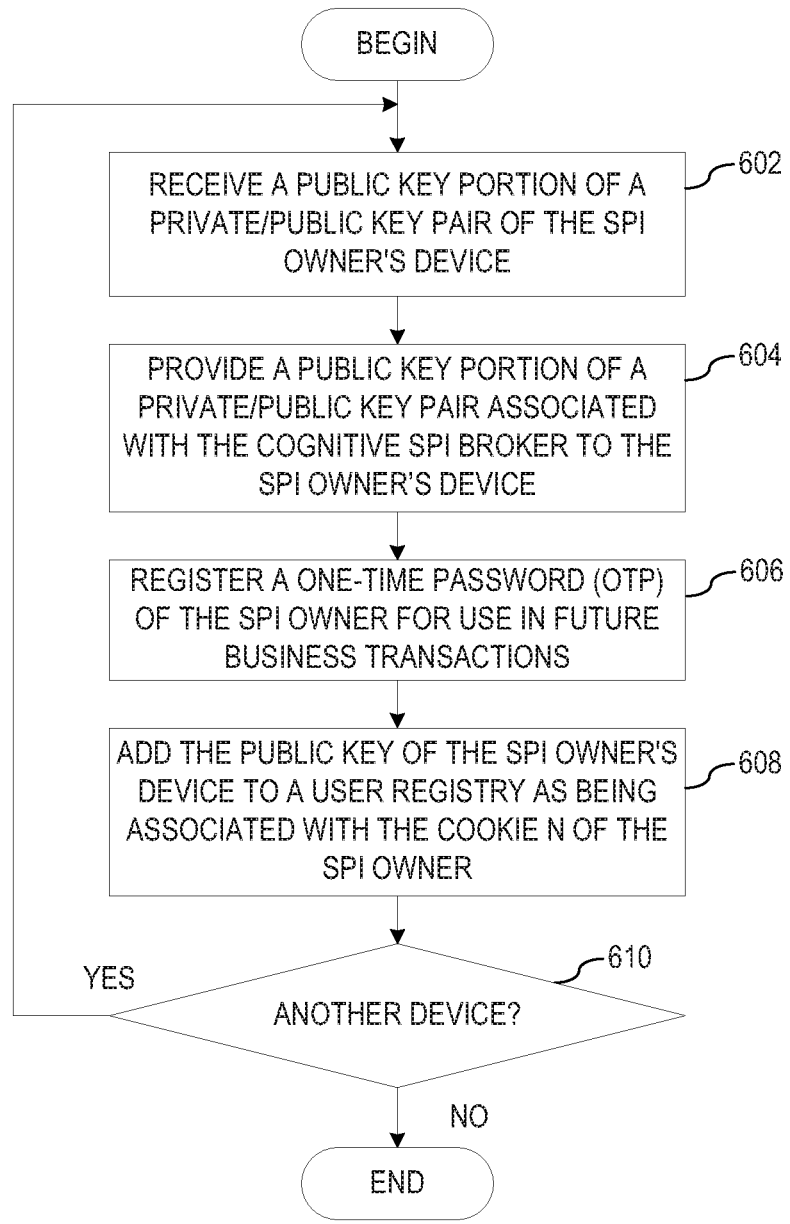
FIG. 6 depicts one exemplary flow diagram of a SPI owner device management process in accordance with an illustrative embodiment.

FIG. 6 depicts one exemplary flow diagram of a SPI owner device management process in accordance with an illustrative embodiment. In accordance with the illustrative embodiments, in the device management process, the SPI owner is required to authorize each of the SPI owner's devices that will be used in secure sensitive private information dependent transactions with the cognitive SPI broker via SPI registration engine. As the operation begins, for each of the SPI owner's devices that will be used in secure sensitive private information dependent transactions, the SPI registration engine receives a public key portion of a private/public key pair of the SPI owner's device (step 602). The SPI registration engine then provides a public key portion of the private/public key pair of the cognitive SPI broker to the SPI owner device (step 604). That is, the public key of the SPI owner's device will be sent to cognitive SPI broker, while the SPI owner's device will receive the public key of cognitive SPI broker. The exchange of public keys between the SPI owner's device and the cognitive SPI broker is to establish a secure channel for each business transaction conducted by the SPI owner via the SPI owner's device and a service provider via the cognitive SPI broker. All communications are secured and encrypted, so that only the intended parties may decrypt and read the contents of the messages in the business transactions. Once the public keys are exchanged, the SPI registration engine registers a one-time password (OTP) of the SPI owner for use in future business transactions (step 606). The SPI registration engine then adds the public key of the SPI owner's device to a user registry as being associated with the cookie N of the SPI owner (step 608). SPI registration engine then determines whether the SPI owner intends to authorize another device (step 610). If at step 610 the SPI owner intends to authorize another device, the operation returns to step 602. If at step 610 the SPI owner does not intend to authorize another device, the operation ends. From this point on, the service provider may conduct business transactions with the cognitive SPI broker via the one or more authorized devices.

Figure 7:
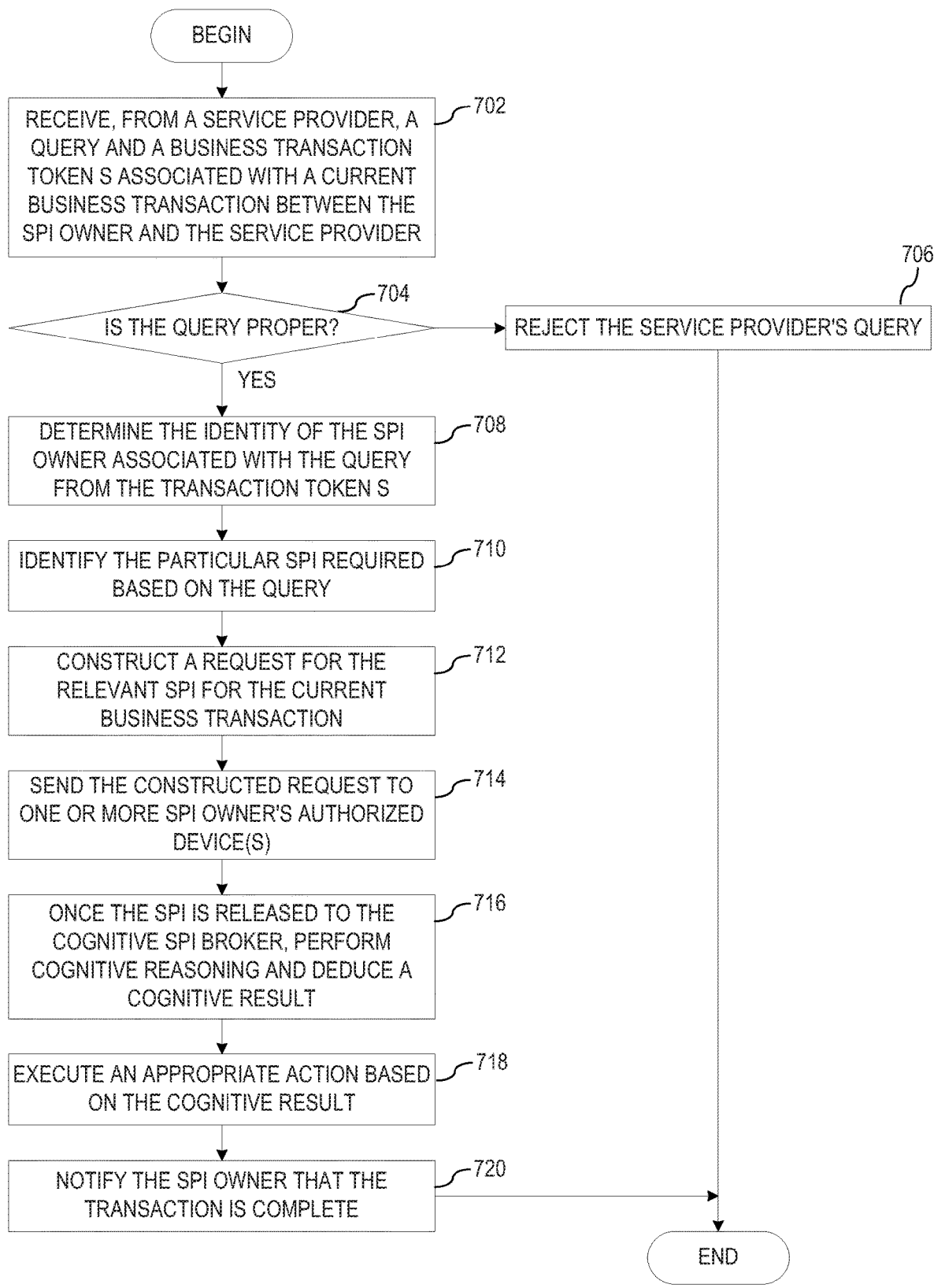
FIG. 7 depicts one exemplary flow diagram of a business transaction process using a cognitive SPI broker in accordance with an illustrative embodiment.

FIG. 7 depicts one exemplary flow diagram of a business transaction process using a cognitive SPI broker in accordance with an illustrative embodiment. As the operation begins, the cognitive SPI broker receives, from a service provider, a query and a business transaction token S associated with a current business transaction between the SPI owner and the service provider (step 702). That is, utilizing the business transaction token S, the service provider builds a query for the cognitive SPI broker, so that the cognitive SPI broker may associate the query with the appropriate SPI Owner identified by the cookie N. The service provider constructs the query using one or more of business rule markup languages, constraint languages, natural languages, or the like. The query may comprise criteria required to be fulfilled or verified by the SPI Owner for the business transaction initiated by the SPI owner. The service provider sends the query, along with the transaction token S, to the cognitive SPI broker for processing.

In sending the query, a service provider facing API from which the service provider is operating signs the query with a private key of the service provider to produce a signature and encrypts the query with the public key of the cognitive SPI broker. In one example, the query to be sent by the service provider is modeled by the equation:

$$x = enc(sign(\{q\}, sk(k)), pk(k))$$

where q represents the query to be sent from the service provider to the cognitive SPI broker, sk(k) represents the private (secret) key of the service provider, sign(sk(k),{q}) represents a query q signed using the private (secret) key sk(k), pk(k) represents the public key of the cognitive SPI broker, and enc($\alpha,\beta$) represents the encryption operator, i.e. the resultant signed query a encrypted using public key $\beta$. Again, query q is composed of cookie N, business transaction token S, requested SPI information, and the request, response, confirmation, or the like.

In receiving the query, the cognitive SPI broker verifies the authenticity of the message by decrypting the signature with the service provider's public key (to confirm that the sender, and no one else, performed the signature operation), which results in only the recipient holding the paired private/public key decrypting the message as no one else possesses this matching private key. In one example, the query to be decrypted from the service provider is modeled by the equation:

$$q = dec(checksign(\{x\}, pk(k)), sk(k))$$

where x represents the signed and encrypted query, pk(k) represents the public key of the service provider, sk(k) represents the private (secret) key of the cognitive SPI broker, checksign(pk(k),{x}) represents checking the validity of the signature of query x by using the public key pk(k) of the service provider, and dec($\gamma,\delta$) represents the decryption operator, i.e. the unsigned query y decrypted using private key $\delta$.

The cognitive reasoning engine in the cognitive SPI broker interprets the query from the service provider to determine whether the query is proper or improper (step 704). If at step 704 the cognitive reasoning engine determines that the query comprises criterion or instructions that are not related to the current transaction, the cognitive reasoning engine immediately rejects the service provider's query (step 706), thereby terminating the business transaction with the operation ending thereafter. If at step 704 the cognitive reasoning engine determines that the query comprises criterion or instructions that are related to the current transaction, the cognitive reasoning engine determines the identity of the SPI owner associated with the query from the transaction token S (step 708). Further, the cognitive reasoning engine also identifies the particular SPI required based on the query (step 710). The cognitive reasoning engine then constructs a request for the relevant SPI for the current business transaction (step 712). Optionally, the constructed request also comprises specific locations of the digital wallets of the SPI owner that store the requested SPI, if known. The cognitive reasoning engine identifies the digital wallets that include the relevant SPI from a taxonomy of the SPI stored in the user registry. Finally, the cognitive reasoning engine sends the constructed request to the application, operating system, or the like, on one or more SPI owner's authorized device(s) (step 714). If the digital wallet(s) that include the requires SPI are known, then the cognitive reasoning engine sends the constructed request only to the SPI owner's authorized devices that comprise the identified digital wallet(s) using an encryption similar to that previously described with regard to service provider. If the digital wallet(s) that include the required SPI are not known, then the cognitive reasoning engine sends the constructed request to all of the SPI owner's devices authorized with the cognitive SPI broker using an encryption similar to that previously described with regard to service provider.

Upon receive the request from the cognitive reasoning engine, the SPI owner authorized device(s) decrypt the request using a decryption similar to that previously described with regard to service provider. After the decryption, the SPI owner authorized device(s) generates a notification to the SPI owner upon receiving the constructed request that prompts the SPI owner for a response. If the digital wallet(s) are identified by the cognitive reasoning engine, then the SPI owner may only need to authorize the constructed request. If the digital wallet(s) are not identified in the constructed request, then the relevant SPI may reside in multiple wallets in the SPI owner's authorized device. The SPI owner will have to select one or more digital wallet(s) from a list of digital wallets available in the SPI owner's authorized device. If the SPI resides on more than one of the SPI owner's authorized devices, then the SPI owner may make multiple digital wallet selects from each of the necessary SPI owner authorized devices. Once the SPI is released to the cognitive SPI broker, the cognitive SPI broker performs cognitive reasoning and deduces a cognitive result (step 716). The cognitive SPI broker then executes the appropriate action based on the cognitive result (step 718) and notifies the SPI owner that the transaction is complete (step 720), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for secure sensitive private information dependent transactions. The mechanisms operate on a broker architecture, where our cognitive SPI broker is coupled with essential security features to prevent and stop the flow of sensitive personal information (SPI) unnecessarily between a service provider and the SPI owner. That is, the cognitive SPI broker is designed to ensure extreme protection of Owner's SPI at all times. The cognitive SPI broker of the illustrative embodiment is equipped with cognitive capabilities and acts as a secure intermediary between service providers and the SPI Owner, allowing the SPI Owner to transact with the service providers securely without revealing the SPI owner's SPI to the service providers throughout the life cycle of the business transaction. SPI owners and service providers sign and encrypt message in the business transaction to ensure end-to-end flow is trustworthy and secure. The service providers construct queries comprising criteria to be fulfilled of verified using one or more of business rule markup languages, constraint languages, natural languages, or the like. The queries are sent to the cognitive SPI broker for processing. The cognitive SPI broker determines the relevant SPI required as input to a cognitive reasoning engine, construct requests for specific SPI, and send the requests for specific SPI to the SPI owner. It is noted that these SPI requests may comprise the locations of the virtual wallets that store the requested SPI, which is determined from a taxonomy of SPI stored in a user registry database in the cognitive SPI broker. This taxonomy comprises mapping of different types of SPI to different virtual wallets stored in different devices belonging to the same SPI owner. In the illustrative embodiments, the SPI owner may either directly approve the request from the cognitive SPI broker if the digital virtual wallets are known or simply selects a virtual wallet(s) from a list of identified virtual wallets in any of the SPI owner's devices if not known. The SPI and the selected virtual wallet will be released to the cognitive SPI broker for decision making process. Finally, based on the requested SPI released by the SPI Owner, criteria in the constructed queries and knowledge base in the cognitive SPI broker, the cognitive SPI broker responds to the service provider with the results of its cognitive reasoning, from which the service provider will execute the required action to complete the business transaction. It is noted that the SPI is not disclosed to the service provider in the business transaction. When the nature of the business transaction requires the SPI of the SPI owner be revealed to the service provider in order to complete the transaction, the relevant SPI will merely be confirmed. The communication with the service provider is encrypted with a public key and the SPI can only be decrypted and read by the service provider, and no one else, because only the merchant possesses the matching private key.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for secure sensitive private information dependent transactions, the method comprising:

executing, by at least one processor of the data processing system, instructions that cause the at least one processor to analyze and process queries and requests from service providers;

registering, by the at least one processor, one or more authorized computing devices associated with a sensitive personal information (SPI) owner, wherein the one or more authorized computing devices have corresponding digital wallets that store SPI data;

dynamically generating, by the at least one processor, for the SPI owner, an associated taxonomy data structure, wherein the taxonomy associates types of SPI data with locations of digital wallets, of the one or more computing devices associated with the SPI owner, that store the associated types of SPI data, wherein different digital wallets store different types of SPI data;

receiving, by the at least one processor, from a computing system associated with a service provider website, a query for SPI of the SPI owner based on an electronic transaction initiated between the SPI owner and the service provider website;

identifying, by the at least one processor, particular SPI data required to complete the electronic transaction based on a cognitive analysis of contents of the query;

searching, by the at least one processor, the taxonomy data structure associated with the SPI owner, to identify one or more locations of digital wallets storing the particular SPI data;

selecting, by the at least one processor, a selected authorized computing device based on the identification of the one or more locations of digital wallets storing the particular SPI data;

transmitting, by the at least one processor, a constructed request to the selected authorized computing device, of the one or more authorized computing devices associated with the SPI owner, having a digital wallet storing the particular SPI data based on results of searching the taxonomy data structure;

receiving, by the at least one processor, the particular SPI data from the selected authorized computing device, thereby forming received SPI; and completing, by the at least one processor, the electronic transaction by using the received SPI, without providing the received SPI to the service provider, but providing a confirmation of validity of the received SPI for completion of the electronic transaction to the service provider, wherein the dynamic generation of the taxonomy data structure comprises a computer learning process by which the at least one processor automatically learns, over time, from processing a plurality of electronic transactions associated with the SPI owner, locations of digital wallets of the one or more authorized computing devices that store different types of SPI data for completing each electronic transaction in the plurality of electronic transactions, and maps different ones of the locations of digital wallets to different types of SPI data based on the learning.

2. The method of claim 1, wherein searching the taxonomy data structure associated with the SPI owner further comprises:

determining, by the at least one processor, whether a location of one or more digital wallets, in one or more authorized devices storing the particular SPI data, is known in the taxonomy data structure; and responsive to the at least one processor identifying the location of the one or more digital wallets, in the one or more authorized devices, that store the particular SPI data, the location of the one or more digital wallets comprising a digital wallet associated with the selected authorized computing device, sending, by the at least one processor, the constructed request to the selected authorized computing device.

3. The method of claim 1, wherein searching the taxonomy data structure associated with the SPI owner further comprises:

determining, by the at least one processor, whether a location of one or more digital wallets, in one or more authorized devices including the particular SPI data, is known in the taxonomy data structure; and responsive to the at least one processor failing to identify the location of the one or more digital wallets, in the one or more authorized devices, that store the particular SPI data, sending, by the at least one processor, the constructed request to all registered authorized computing devices associated with the SPI owner.

4. The method of claim 3, wherein the constructed request sent to all registered authorize computing devices associated with the SPI owner further comprises a listing of the one or more authorized computing devices to which the constructed request was sent, and a request that a user respond by selecting an authorized computing device from the listing that is to provide the particular SPI data.

5. The method of claim 3, wherein the constructed request sent to all registered authorized computing devices associated with the SPI owner further comprises a listing of all instances of the particular SPI data stored in the one or more digital wallets that satisfy conditions of the query, and a request that a user respond by selecting an instances of the particular SPI data to be used to complete the electronic transaction.

6. The method of claim 3, wherein the constructed request sent to all registered authorized computing devices associated with the SPI owner further comprises a listing of digital wallets that store the particular SPI data, and a request that a user respond by selecting a digital wallet from which the particular SPI data is to be provided and used to complete the electronic transaction.

7. The method of claim 1, wherein the query comprises criterion for SPI data specified in natural language content of the query, and wherein the at least one processor is configured to implement a cognitive reasoning engine that interprets the natural language content to identify the criterion for the SPI data.

8. The method of claim 7, wherein the cognitive reasoning engine further validates the criterion for SPI data is related to the electronic transaction, and if the criterion for the SPI data is not related to the electronic transaction, terminates the electronic transaction.

9. The method of claim 1, wherein the query is an encrypted query generated by applying a private key of a service provider to an original query to generate a signature and encrypting the query with a public key of the at least one processor, wherein the encrypted query is modeled by the signed and encrypted original query x relationship:

$$x = enc(\text{sign}(\{q\}, sk(k)), pk(k))$$

where q represents the original query to be sent from the service provider computing system associated with the service provider website to the at least one processor, sk(k) represents the private key of service provider, sign(sk(k), {q}) represents a signature of the original query q signed using the private key sk(k), pk(k) represents the public key of the at least one processor, and enc($\alpha,\beta$) represents an encryption operator where $\alpha$ is a resultant signed query encrypted using a public key $\beta$.

10. The method of claim 9, wherein the at least one processor verifies an authenticity of the received query by decrypting the received query with the public key of the service provider, resulting in the at least one processor accessing the paired private key and public key of the service provider, and wherein the at least one processor decrypts the received query based on the model:

$$q = dec(\text{checksign}(\{x\}, pk(k)), sk(k))$$

where x represents the signed and encrypted original query, pk(k) represents the public key of service provider, sk(k) represents the private key of the at least one processor, checksign(pk(k), {x}) represents checking the validity of the signature of the signed and encrypted query x by using the public key pk(k) of service provider, and dec($\gamma,\delta$) represents the decryption operator where the unsigned query $\gamma$ is decrypted using private key $\delta$.

11. The method of claim 1, wherein the at least one processor registers a plurality of SPI owners, and each SPI owner has a corresponding taxonomy data structure specific to that SPI owner and that SPI owner's associated computing devices.

12. The method of claim 1, wherein the SPI owner registers a plurality of locations of a plurality of digital wallets associated with a plurality of computing devices, and wherein at least two digital wallets in the plurality of digital wallets store different types of SPI data.

13. A computer readable storage medium having a computer readable program stored therein, wherein the computer readable program, when executed on a computing device, causes the computing device to:
 execute, by at least one processor of the computing device, instructions that cause the at least one processor to process queries and requests from service providers;
 register, by the at least one processor, one or more authorized computing devices associated with a sensitive personal information (SPI) owner, wherein the one or more authorized computing devices have corresponding digital wallets that store SPI data;
 dynamically generate, by the at least one processor, for the SPI owner, an associated taxonomy data structure, wherein the taxonomy associates types of SPI data with locations of digital wallets, of the one or more computing devices associated with the SPI owner, that store the associated types of SPI data, wherein different digital wallets store different types of SPI data;
 receive, by the at least one processor, from a computing system associated with a service provider website, a query for SPI of the SPI owner based on an electronic transaction initiated between the SPI owner and the service provider website;
 identify, by the at least one processor, particular SPI data required to complete the electronic transaction based on a cognitive analysis of contents of the query;
 search, by the at least one processor, the taxonomy data structure associated with the SPI owner, to identify one or more locations of digital wallets storing the particular SPI data;
 select, by the at least one processor, a selected authorized computing device based on the identification of the one or more locations of digital wallets storing the particular SPI data;
 transmit, by the at least one processor, a constructed request to the selected authorized computing device, of the one or more authorized computing devices associated with the SPI owner, having a digital wallet storing the particular SPI data based on results of searching the taxonomy data structure;
 receive, by the at least one processor, the particular SPI data from the selected authorized computing device, thereby forming received SPI; and
 complete, by the at least one processor, the electronic transaction by using the received SPI, without providing the received SPI to the service provider, but providing a confirmation of validity of the received SPI for completion of the electronic transaction to the service provider, wherein the dynamic generation of the taxonomy data structure comprises a computer learning process by which the at least one processor automatically learns, over time, from processing a plurality of electronic transactions associated with the SPI owner, locations of digital wallets of the one or more authorized computing devices that store different types of SPI data for completing each electronic transaction in the plurality of electronic transactions, and maps different ones of the locations of digital wallets to different types of SPI data based on the learning.

14. The computer readable storage medium of claim 13, wherein the computer readable program further causes the computing device to search the taxonomy data structure associated with the SPI owner at least by:
 determining, by the at least one processor, whether a location of one or more digital wallets in one or more authorized devices storing the particular SPI data is known in the taxonomy data structure; and
 responsive to the at least one processor identifying the location of the one or more digital wallets, in the one or more authorized devices, that store the particular SPI data, the location of the one or more digital wallets comprising a digital wallet associated with the selected authorized computing device, sending, by the at least one processor, the constructed request to the selected authorized computing device.

15. The computer readable storage medium of claim 13, wherein the computer readable program further causes the computing device to search the taxonomy data structure associated with the SPI owner at least by:
 determining, by the at least one processor, whether a location of one or more digital wallets, in one or more authorized devices including the particular SPI data, is known in the taxonomy data structure; and
 responsive to the at least one processor failing to identify the location of the one or more digital wallets, in the one or more authorized devices, that store the particular SPI data, sending, by the at least one processor, the constructed request to all registered authorized computing devices associated with the SPI owner.

16. An apparatus comprising:
 at least one processor; and
 at least one memory coupled to the at least one processor, wherein the at least one memory comprises instructions which, when executed by the at least one processor, cause the at least one processor to:
  execute instructions that cause the at least one processor to process queries and requests from service providers;
  register one or more authorized computing devices associated with a sensitive personal information (SPI) owner, wherein the one or more authorized computing devices have corresponding digital wallets that store SPI data;
  dynamically generate for the SPI owner, an associated taxonomy data structure, wherein the taxonomy associates types of SPI data with locations of digital wallets, of the one or more computing devices associated with the SPI owner, that store the associated types of SPI data, wherein different digital wallets store different types of SPI data;
  receive, from a computing system associated with a service provider website, a query for SPI of the SPI owner based on an electronic transaction initiated between the SPI owner and the service provider website;
  identify particular SPI data required to complete the electronic transaction based on a cognitive analysis of contents of the query;
  search the taxonomy data structure associated with the SPI owner, to identify one or more locations of digital wallets storing the particular SPI data;
  select a selected authorized computing device based on the identification of the one or more locations of digital wallets storing the particular SPI data;
  transmit a constructed request to the selected authorized computing device, of the one or more authorized computing devices associated with the SPI owner, having a digital wallet storing the particular SPI data based on results of searching the taxonomy data structure;

receive the particular SPI data from the selected authorized computing device, thereby forming received SPI; and complete, by the at least one processor, the electronic transaction by using the received SPI, without providing the received SPI to the service provider, but providing a confirmation of validity of the received SPI for completion of the electronic transaction to the service provider, wherein the dynamic generation of the taxonomy data structure comprises a computer learning process by which the at least one processor automatically learns, over time, from processing a plurality of electronic transactions associated with the SPI owner, locations of digital wallets of the one or more authorized computing devices that store different types of SPI data for completing each electronic transaction in the plurality of electronic transactions, and maps different ones of the locations of digital wallets to different types of SPI data based on the learning.

17. The apparatus of claim 16, wherein the instructions further cause the at least one processor to search the taxonomy data structure associated with the SPI owner at least by:

determining whether a location of one or more digital wallets, in one or more authorized devices storing the particular SPI data, is known in the taxonomy data structure; and responsive to identifying the location of the one or more digital wallets, in the one or more authorized devices, that store the particular SPI data, the location of the one or more digital wallets comprising a digital wallet associated with the selected authorized computing device, sending the constructed request to the selected authorized computing device.

18. The apparatus of claim 16, wherein the instructions further cause the at least one processor to search the taxonomy data structure associated with the SPI owner at least by:

determining whether a location of one or more digital wallets, in one or more authorized devices including the particular SPI data, is known in the taxonomy data structure; and responsive to failing to identify the location of the one or more digital wallets, in the one or more authorized devices, that store the particular SPI data, sending the constructed request to all registered authorized computing devices associated with the SPI owner.

* * * * *